(12) United States Patent
Schaaf

(10) Patent No.: US 8,414,045 B2
(45) Date of Patent: Apr. 9, 2013

(54) VACUUM GRIPPER

(75) Inventor: Walter Schaaf, Freudenstadt-Gruental (DE)

(73) Assignee: J. Schmalz GmbH, Glatten (DE)

( * ) Notice: Subject to any disclaimer, the term of this patent is extended or adjusted under 35 U.S.C. 154(b) by 176 days.

(21) Appl. No.: 12/952,880

(22) Filed: Nov. 23, 2010

(65) Prior Publication Data

US 2011/0121590 A1    May 26, 2011

(30) Foreign Application Priority Data

Nov. 24, 2009    (DE) .................... 10 2009 047 091

(51) Int. Cl.
*A47J 45/00*    (2006.01)

(52) U.S. Cl. .......................................... 294/183; 269/21

(58) Field of Classification Search ................. 294/188, 294/183, 185, 902, 907; 901/40; 269/20, 269/21
See application file for complete search history.

(56) References Cited

U.S. PATENT DOCUMENTS

| | | | |
|---|---|---|---|
| 6,051,074 A * | 4/2000 | Strodtbeck et al. ........... 118/729 |
| 6,202,292 B1 * | 3/2001 | Farnworth et al. ............. 29/743 |
| 6,427,991 B1 * | 8/2002 | Kao ................................. 269/21 |
| 6,837,293 B1 * | 1/2005 | Mok et al. ...................... 156/571 |
| 2004/0150237 A1 * | 8/2004 | Casarotti et al. ............. 294/64.1 |
| 2006/0113719 A1 * | 6/2006 | Nagai et al. ...................... 269/20 |
| 2006/0157905 A1 * | 7/2006 | Lenzini ............................ 269/21 |

FOREIGN PATENT DOCUMENTS

| | | |
|---|---|---|
| DE | 297 07 897 U1 | 8/1997 |
| DE | 198 17 217 C1 | 8/1999 |
| DE | 202 09 985 U1 | 10/2002 |
| DE | 10 2004 016 637 | 10/2005 |
| DE | 10 2004 021 213 | 11/2005 |
| EP | 1 586 419 A2 | 10/2005 |
| EP | 1 997 594 A1 | 12/2008 |

\* cited by examiner

*Primary Examiner* — Dean Kramer
*Assistant Examiner* — Stephen Vu
(74) *Attorney, Agent, or Firm* — Henry M. Feiereisen LLC

(57) ABSTRACT

A vacuum gripper includes a suction plate for gripping an object. The suction plate has a lid and a suction bottom which define a suction chamber there between and engage formfittingly at least on one side within one another via a tongue and groove joint extending in parallel relation to a gripping plane. The tongue and groove joint includes a groove on one of the suction bottom and lid, and a tongue which is formed on the other one of the suction bottom and lid and fits into the groove.

19 Claims, 2 Drawing Sheets

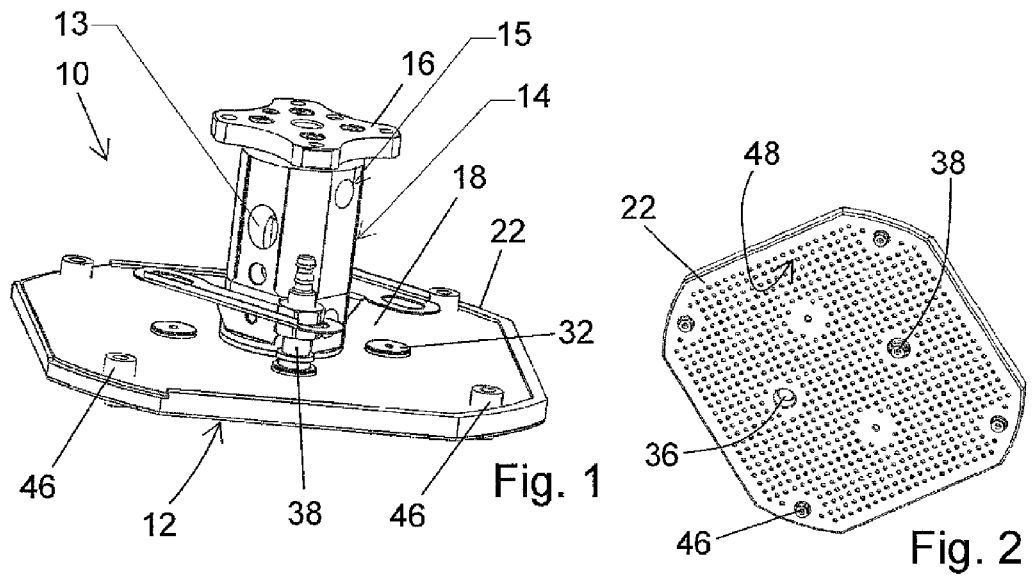
Fig. 1
Fig. 2
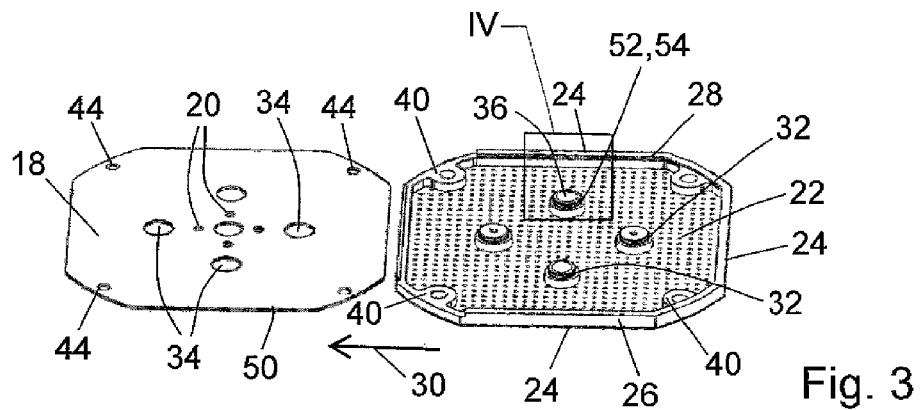
Fig. 3
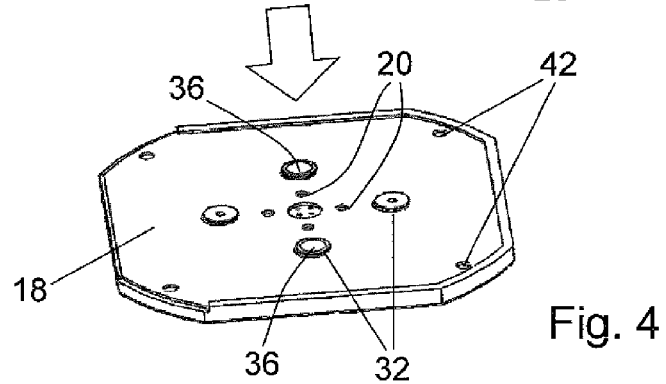
Fig. 4

VACUUM GRIPPER

CROSS-REFERENCES TO RELATED APPLICATIONS

This application claims the priority of German Patent Application, Serial No. 10 2009 047 091.3, filed Nov. 24, 2009, pursuant to 35 U.S.C. 119(a)-(d), the content of which is incorporated herein by reference in its entirety as if fully set forth herein.

BACKGROUND OF THE INVENTION

The present invention relates to a vacuum gripper.

The following discussion of related art is provided to assist the reader in understanding the advantages of the invention, and is not to be construed as an admission that this related art is prior art to this invention.

Vacuum grippers, also referred to as area vacuum grippers, can be made from an extruded section and include a lid and a suction bottom which are threadably engaged with one another to form and bound a suction chamber. When the suction bottom, which faces the object to be gripped by suction, becomes worn or damaged, the threaded connection must be loosened to enable a replacement of the suction bottom. This is i.a. time-consuming.

It would therefore be desirable and advantageous to provide an improved vacuum gripper to obviate prior art shortcomings.

SUMMARY OF THE INVENTION

According to one aspect of the present invention, a vacuum gripper includes a suction plate for gripping an object, with the suction plate having a lid and a suction bottom which define a suction chamber there between and engage formfittingly at least on one side within one another via a tongue and groove joint extending in parallel relation to a gripping plane, wherein the tongue and groove joint includes a groove on one of the suction bottom and lid, and a tongue which is formed on the other one of the suction bottom and lid and fits into the groove.

The present invention resolves prior art problems by providing a tongue and groove joint as a connection between the lid and the suction bottom so that these components can be pushed into one another. One component has hereby the groove to receive the rim of the other component. As a result, the vacuum gripper is not only lightweight and compact but can also be assembled in a simple and rapid manner. There is no need to loosen any threaded connections.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a top and side perspective view of a vacuum gripper according to the present invention;

FIG. 2 is a bottom perspective view of the vacuum gripper of FIG. 1;

FIG. 3 is a perspective view of a lid and a suction bottom of a suction plate of the vacuum gripper, depicting the suction bottom removed from the lid to show internal elements;

FIG. 4 is a perspective view of the suction plate with lid and suction bottom joined together.

DETAILED DESCRIPTION OF PREFERRED EMBODIMENTS

Figure 5:
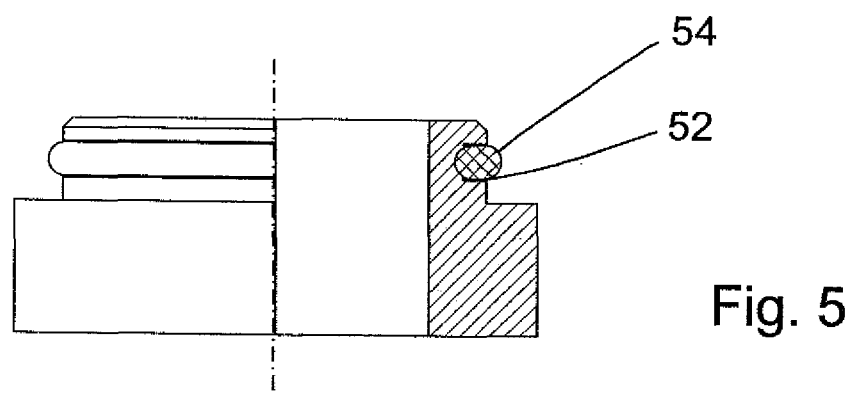
FIG. 5 is an enlarged partly sectional detailed view of an area marked IV in FIG. 1.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top and side perspective view of a vacuum gripper according to the present invention, generally designated by reference numeral 10 and intended for example to handle workpieces by means of vacuum application such as via a vacuum generator which can be in the form of a pneumatically actuated ejector 13. The vacuum gripper 10 includes a suction plate 12 which is attached to a gripper support generally designated by reference numeral 14. The gripper support 14 includes a flange 16 for securement of the gripper support 14 to an unillustrated robotic arm for example. Further shown is a blow-off device 15 on the gripper support 14. The flange-distal end of the gripper support 14 is mounted to a lid 18 which forms a part of the suction plate 12. The lid 18 has fastening openings 20 which are shown in greater detail in FIG. 3 and provided to connect the lid 18 to the gripper support 14 via suitable fastening elements. The lid 18 constitutes a support for a suction bottom 22 which forms another part of the suction plate 12 and is formfittingly connected via a tongue and groove joint to the lid 18 so that a suction chamber is formed between the suction bottom 22 and the lid 18. The suction bottom 22 has three sides 24 formed with a latitude rim 26 which projects out in a direction of the lid 18. The rim 26 is provided on the inside with a groove 28 which extends in parallel relationship to a plane of the lid 18. The rim 26 and the groove 28 have dimensions so selected that a rim 50 of the lid 18 can be fitted into the groove 28 of the rim 26 or the suction bottom 22 can be pushed onto the lid 18 in a direction of arrow 30. The rim 50 of the lid 18 thus forms the tongue of the tongue and groove joint.

The assembled suction plate 12 with joined lid 18 and suction bottom 22 is shown in FIG. 4.

As further shown in FIG. 3, the suction bottom 22 has an inner side which is provided with projecting domes 32 for fastening and securement of the suction bottom 22 to the lid 18. The domes 32 have a vertical dimension which extends beyond the push-in plane for the lid 18 as defined by the groove 28 and are able to extend with their free ends through receiving openings 34 in the lid 18. The domes 32 are widened directly below the push-in plane so as to support the lid 18. Further support elements 40 for the lid 18 are provided in the corner areas of the suction bottom 22 to define a height of the suction chamber. The suction bottom has receiving openings 42 which are aligned with through openings 44 in the lid 18, when the suction bottom 22 and the lid 18 are joined to form the suction plate 12. Placed in the receiving openings 42 are impact absorbers 46 which project beyond a perforated underside 48 of the suction bottom 22. Sensors or the like may also be secured in the receiving openings 42 of the suction bottom 22.

The domes 32 may be provided with through openings 36 for attachment of a sensor 38 for example, as shown in FIG. 2. Each dome 32 may further be provided with a groove 52 at its free end for receiving a fastening element, e.g. an O ring, a snap ring, or the like, or provided with a bulbed end 54 to engage behind the associated receiving opening 34 and locked therewith, as shown in FIG. 5.

When damaged or worn, the suction bottom 22 can be detached from the domes 32 and withdrawn from the lid 18. If necessary, the impact absorbers 46 and sensors 38 may have to be removed beforehand.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A vacuum gripper, comprising a suction plate for gripping an object, said suction plate having a lid and a suction bottom which define a suction chamber there between and engage formfittingly at least on one side within one another via a tongue and groove joint extending in parallel relation to a gripping plane, wherein the tongue and groove joint includes a groove on one of the suction bottom and lid, and a tongue which is formed on the other one of the suction bottom and lid and fits into the groove, wherein the suction bottom has three side edges formed with a rim projecting in a direction of the lid having a radial inner surface provided with a latitude groove.

2. The vacuum gripper of claim 1, wherein the lid and the suction bottom formfittingly engage within one another on two sides.

3. The vacuum gripper of claim 2, wherein the two sides oppose one another.

4. The vacuum gripper of claim 1, wherein the lid has a rim to form the tongue for engagement in the groove.

5. The vacuum gripper of claim 1, further comprising an impact absorber on the suction bottom or lid for providing attenuation during suction of the object.

6. A vacuum gripper, comprising a suction plate for gripping an object, said suction plate having a lid and a suction bottom which define a suction chamber there between and engage formfittingly at least on one side within one another via a tongue and groove joint extending in parallel relation to a gripping plane, wherein the tongue and groove joint includes a groove on one of the suction bottom and lid, and a tongue which is formed on the other one of the suction bottom and lid and fits into the groove, wherein a member selected from the group consisting of lid-proximal side of the suction bottom and suction-bottom-proximal side of the lid has at least one projecting dome which has a free end formed with a groove for receiving a fastening element, wherein the fastening element is an O ring or a snap ring.

7. The vacuum gripper of claim 6, wherein the dome is engaged in a receiving opening of the member.

8. The vacuum gripper of claim 7, wherein the receiving opening extends in a plane of the member.

9. The vacuum gripper of claim 7, wherein the receiving opening is inset or inwardly recessed.

10. The vacuum gripper of claim 6, wherein the dome has a free bulbed end to engage behind the receiving opening.

11. The vacuum gripper of claim 6, further comprising a sensor received in the dome to monitor a suction operation.

12. The vacuum gripper of claim 11, wherein the sensor is a member selected from the group consisting of distance sensor, pressure sensor, and flow sensor.

13. The vacuum gripper of claim 6, further comprising a blow-off device.

14. The vacuum gripper of claim 6, wherein the lid and the suction bottom formfittingly engage within one another on two sides.

15. The vacuum gripper of claim 14, wherein the two sides oppose one another.

16. The vacuum gripper of claim 6, wherein the lid has a rim to form the tongue for engagement in the groove.

17. The vacuum gripper of claim 6, further comprising an impact absorber on the suction bottom or lid for providing attenuation during suction of the object.

18. A vacuum gripper, comprising:
   a suction plate for gripping an object, said suction plate having a lid and a suction bottom which define a suction chamber there between and engage formfittingly at least on one side within one another via a tongue and groove joint extending in parallel relation to a gripping plane, wherein the tongue and groove joint includes a groove on one of the suction bottom and lid, and a tongue which is formed on the other one of the suction bottom and lid and fits into the groove; and
   a vacuum generator secured to the lid or suction bottom, wherein the vacuum generator is a pneumatically actuated ejector.

19. The vacuum gripper of claim 18, constructed for attachment to a gripper support, said vacuum generator being integrated in the gripper support.

\* \* \* \* \*